United States Patent
Hotta et al.

(10) Patent No.: US 6,887,913 B2
(45) Date of Patent: May 3, 2005

(54) METHOD FOR PRODUCING A RIGID FOAMED SYNTHETIC RESIN

(75) Inventors: Hiromichi Hotta, Ibaraki (JP); Hisashi Sato, Ibaraki (JP); Tadanobu Kuroki, Ibaraki (JP); Genichirou Enna, Ibaraki (JP)

(73) Assignee: Asahi Glass Company, Limited, Tokyo (JP)

( * ) Notice: Subject to any disclaimer, the term of this patent is extended or adjusted under 35 U.S.C. 154(b) by 85 days.

(21) Appl. No.: 10/197,580

(22) Filed: Jul. 18, 2002

(65) Prior Publication Data

US 2003/0032688 A1 Feb. 13, 2003

(30) Foreign Application Priority Data

Jul. 18, 2001 (JP) ......................................... 2001-218644

(51) Int. Cl.⁷ ................................................ C08G 18/28
(52) U.S. Cl. ....................... 521/170; 521/114; 521/116; 521/130; 521/137; 521/171; 521/174
(58) Field of Search ................................ 521/114, 116, 521/130, 137, 170, 171, 174

(56) References Cited

U.S. PATENT DOCUMENTS 4,356,273 A   10/1982   Soch
5,126,379 A   6/1992   Volkert et al.
5,565,497 A   10/1996   Godbey et al.
6,476,114 B2 * 11/2002  Goeman et al. ............ 524/462

FOREIGN PATENT DOCUMENTS

JP        60-199015       10/1985

\* cited by examiner

*Primary Examiner*—John M. Cooney, Jr.
(74) *Attorney, Agent, or Firm*—Oblon, Spivak, McClelland, Maier & Neustadt, P.C.

(57) ABSTRACT

A method for producing a rigid foamed synthetic resin, which comprises reacting a polyol with a polyisocyanate compound in the presence of water, a catalyst and a fluorine-containing compound of the formula 1:

$$R^f-\text{O-(A-O)}_n-R \quad \text{Formula 1}$$

where in the formula 1, $R^f$ is a $C_{2-27}$ fluorine-containing organic group, n is an integer of from 1 to 100, A is an alkylene group having a carbon number in the straight chain portion between bonds of from 2 to 4, provided that when n is from 2 to 100, the plurality of A may be the same or different, and R is a hydrogen atom, a $C_{1-18}$ alkyl group or a $C_{1-18}$ acyl group.

9 Claims, No Drawings

METHOD FOR PRODUCING A RIGID FOAMED SYNTHETIC RESIN

The present invention relates to a method for producing a rigid foamed synthetic resin such as a rigid polyurethane foam, and production of a closed cell rigid foamed synthetic resin employing water as a main blowing agent.

It has been widely carried out to produce a rigid foamed synthetic resin by reacting a polyhydroxyl compound with a polyisocyanate compound in the presence of a blowing agent or a catalyst. The rigid foamed synthetic resin to be obtained may, for example, be a rigid urethane foam or a rigid polyisocyanate foam.

Each cell of a closed cell foamed product of a rigid foamed synthetic resin is closed, a blowing agent having a low coefficient of thermal conductivity such as a halogenated hydrocarbon can be sealed therein, and such a foamed product has excellent heat-insulating properties.

Various compounds have been known as a blowing agent for production of a foamed synthetic resin, and HCFC-141b which is one type of hydrochlorofluorocarbons has mainly been used.

It is considered that part of a hydrochlorofluorocarbon used as a blowing agent leaks into the air, thus causing ozone layer destruction, and accordingly it has been proposed to use mainly water as a blowing agent, as an alternative.

Water has conventionally been used as an important sub-blowing agent for a rigid polyurethane foam, but it has been difficult to use water in a high proportion capable of replacing HCFC-141b used as a main blowing agent for a rigid polyurethane foam. The reason is that since the air blow membrane permeation rate of formed carbon dioxide gas is high, when a closed cell rigid foamed synthetic resin obtained by using a large amount of water is left to stand for a long period of time, the inside of the cells becomes under negative pressure relative to the atmospheric pressure, and the foamed resin gradually shrinks and deforms. Such a phenomenon is remarkable particularly under high temperature and high humidity conditions. As a countermeasure, a so-called open cell type rigid foamed synthetic resin in which cell membranes are broken may be mentioned, but it is poor in heat insulating properties and is not suitable for a heat insulating material.

Under these circumstances, it is an object of the present invention to provide a method for producing a rigid foamed synthetic resin having a small change in dimension, particularly a small change in dimension under high temperature and high humidity conditions, by using water as a main blowing agent.

The present invention has been made to overcome the above-described problems. The present inventors have found that the above problems can be overcome by using a specific fluorine-containing compound, and accomplished the present invention.

Namely, the present invention provides a method for producing a rigid foamed synthetic resin, which comprises reacting a polyol with a polyisocyanate compound in the presence of water, a catalyst and a fluorine-containing compound of the formula 1:

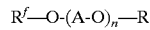   Formula 1 where in the formula 1, $R^f$ is a $C_{2-27}$ fluorine-containing organic group, n is an integer of from 1 to 100, A is an alkylene group having in the straight chain portion between bonds of from 2 to 4, provided that when n is from 2 to 100, the plurality of A may be the same or different, and R is a hydrogen atom, a $C_{1-18}$ alkyl group or a $C_{1-18}$ acyl group.

The present invention further provides the above method for producing a rigid foamed synthetic resin, wherein n in the formula 1 is from 2 to 100.

The present invention further provides the above method for producing a rigid foamed synthetic resin, wherein the fluorine-containing compound is used in an amount of from 0.01 to 1 part by mass per 100 parts by mass of the total amount of the polyol and the polyisocyanate compound.

Still further, the present invention provides the above method for producing a rigid foamed synthetic resin, wherein water is used in an amount of from 4 to 16 parts by mass per 100 parts by mass of the polyol.

The polyol used in the present invention is not particularly limited, and one which is generally used as a material for a rigid polyurethane foamed synthetic resin can be used. A polyether polyol obtained by reacting at least one alkylene oxide such as ethylene oxide or propylene oxide with a bivalent to octavalent active hydrogen-containing compound such as water, ethylene glycol, propylene glycol, glycerol, trimethylolpropane, pentaerythritol, ethylenediamine, toluenediamine, sorbitol or sucrose, as an initiator, is particularly preferred. E.g. a polyester polyol may optionally be used. The polyol may be used alone or as a mixture of at least two types thereof.

The hydroxyl value of the polyol is preferably from 200 to 500 mgKOH/g, particularly preferably from 250 to 500 mgKOH/g.

The polyisocyanate compound may be an aromatic, alicyclic or aliphatic polyisocyanate having at least two isocyanate groups or a modified polyisocyanate obtained by modifying it. An aromatic polyisocyanate and its modified product are preferred.

Specific examples thereof include polyisocyanates such as tolylene diisocyanate, diphenylmethane diisocyanate, polymethylene polyphenyl polyisocyanate (common name: polymeric MDI), xylylene diisocyanate, isophorone diisocyanate and hexamethylene diisocyanate, and their urethane modified products, isocyanurate modified products, urea modified products and carbodiimide modified products. The polyisocyanate compound may be used alone or as a mixture of at least two types thereof.

When the amount of the polyisocyanate compound used based on the polyol is represented by the number of isocyanate groups per 100 active hydrogen groups in total of active hydrogen compounds such as the polyol and water (isocyanate index), the isocyanate index is preferably from 50 to 300, more preferably from 80 to 200, particularly preferably from 90 to 150.

The fluorine-containing compound is represented by the formula 1. $R^f$ is a $C_{2-27}$ fluorine-containing organic group. The fluorine-containing organic group is preferably a $C_{2-27}$ polyfluoroalkyl group or a group containing an oxygen atom or a nitrogen atom in a carbon-carbon bond of said polyfluoroalkyl group (hereinafter these groups will be referred to as $R^{fO}$) is preferred, and the former is particularly preferred.

The $R^{fO}$ group is composed of a $C_{1-22}$ polyfluoroalkyl group which may have an oxygen atom or a nitrogen atom (hereinafter referred to as $R^{fB}$ group) (B moiety) and the straight chain or branched alkylene group (C moiety). The $R^{fB}$ group is a group having at least two hydrogen atoms in an alkyl group substituted with fluorine atoms or a group containing an oxygen atom or a nitrogen atom in a carbon-carbon bond of said group, and the former is preferred. The carbon number of the $R^{fB}$ group is preferably from 1 to 16, particularly preferably from 4 to 16, especially preferably from 6 to 14. The number of fluorine atoms in the $R^{fB}$ group is preferably at least 60%, particularly preferably at least 80%, as represented by (number of fluorine atoms in $R^{fB}$ group)/(number of hydrogen atoms in an alkyl group having the same carbon number corresponding to $R^{fB}$ group)×100 (%). Further, the $R^{fB}$ group preferably has a straight chain structure or a branched structure, particularly preferably a straight chain structure. In a case of a branched structure, the branched moiety is preferably a short chain having a carbon number of from about 1 to about 3, and present at the terminal of the $R^{fB}$ group.

The $R^{fB}$ group is preferably a perfluoroalkyl group or a group containing an oxygen atom or a nitrogen atom in a carbon-carbon bond of said group (hereinafter they will be referred to as $R^{FB}$ group), and the former is preferred. Further, a straight chain structure is preferred. The $R^{FB}$ group is a group having substantially all the hydrogen atoms substituted with fluorine atoms. The carbon number of the $R^{fB}$ group is preferably from 1 to 16, particularly preferably from 6 to 14. The $R^{FB}$ group is preferably a straight chain group represented by $F(CF_2)_m$— (wherein m is an integer of from 1 to 18). m is preferably from 4 to 16, particularly preferably from 6 to 14.

The straight chain $R^{FB}$ group may be obtained by telomerization of $C_2F_5I$ with tetrafluoroethylene. The branched structure $R^{FB}$ group may be obtained by oligomerization of a fluorine-containing monomer such as tetrafluoroethylene or hexafluoropropylene with a catalyst such as KF or CsF. The $R^{FB}$ group containing an oxygen atom may be obtained by ring-opening polymerization of hexafluoropropylene oxide.

The fluorine-containing compound may be a mixture of at least two compounds having different carbon numbers of the $R^{fB}$ group. Particularly preferred is a mixture containing a fluorine-containing compound having a carbon number of the $R^{fB}$ group of from 6 to 14 as the main component, wherein the average carbon number of the $R^{fB}$ group is from 8 to 10.

The C moiety in the $R^{fO}$ group is a $C_{1-5}$ straight chain or branched alkylene group. The carbon number of the C moiety is preferably 2, 3 or 4, particularly preferably 3 or 4. The C moiety is most preferably a $C_3$ alkylene group. A fluorine-containing compound wherein the C moiety is a $C_3$ alkylene group is a compound excellent in chemical stability and heat resistance.

The C moiety may, for example, be an ethylene group, a trimethylene group, a tetramethylene group, a propylene group [—CH$_2$CH(CH$_3$)—], a butylene group [—CH(CH$_3$)CH$_2$CH$_2$—, —CH$_2$CH(CH$_3$)CH$_2$—, —CH(CH$_3$)CH(CH$_3$)—].

n in the fluorine-containing compound is an integer of from 1 to 100, preferably from 2 to 50, particularly preferably from 2 to 15. The fluorine-containing compound of the present invention may be a mixture of at least two compounds wherein n is different, and in such a case, the average of n is preferably within a range of from 1 to 50, more preferably from 2 to 30, particularly preferably from 2 to 15.

A in the fluorine-containing compound (formula 1) is an alkylene group having a carbon number in the straight chain portion between bonds of from 2 to 4, and a hydrogen atom in the alkylene group may be substituted with an aromatic hydrocarbon group or an alkoxy group. The carbon number in the straight chain portion between bonds is meant for the carbon number in the straight chain portion having carbon atoms with a bond at terminals, including the two carbon atoms.

A may, for example, be an ethylene group, a propylene group, a 1,2-butylene group, a 2,3-butylene group, a tetramethylene group, —CH(C$_6$H$_5$)CH$_2$—, —CH(CH$_2$OR$_1$)CH$_2$—. A $C_{2-4}$ alkylene group is preferred, and an ethylene group, a propylene group or a tetramethylene group is particularly preferred. Here, $R^1$ is a $C_{1-10}$ alkyl group and as $R^1$, a methyl group, a butyl group or a 2-ethylhexyl group is preferred.

When n is from 2 to 100, the plurality of A in the formula 1 may be the same or different. When the plurality of A are different, preferably two or three types of A are present, particularly preferably two types. In the fluorine-containing compound, one type or two types of A are preferably present, particularly preferably two types of an ethylene group and a propylene group are present.

The (A-O)$_n$ moiety in the formula 1 is preferably a structure formed by ring-opening addition reaction of a cyclic ether as described hereinafter, and oxyethylene, oxypropylene, oxy(1,2-butylene), oxy(2,3-butylene), oxy(ixobutylene), oxy(trimethylene), oxy(1- or 2-methyltrimethylene), oxy(1- or 2-phenoxymethylethylene), oxy(tetramethylene), oxy(1- or 2-oxyphenylethylene), oxy(1- or 2-alkoxyethylene), etc., or a structure comprising at least two groups of at least one member selected from the above groups connected, may be mentioned. Among them, the (A-O)$_n$ moiety in the formula 1 is preferably an oxyalkylene group or a polyoxyalkylene group, particularly preferably a polyoxyalkylene group, especially preferably a polyoxyethylene group or a polyoxypropylene group. Further, the (A-O)$_n$ moiety in the formula 1 is preferably a structure comprising at least one oxyethylene group and at least one oxypropylene group connected in a block or randomly.

The (A-O)$_n$ moiety is formed preferably subjecting a cyclic ether to ring-opening addition reaction. The cyclic ether is preferably a compound containing a three- to five-membered cyclic ether group having one oxygen atom in the cycle, particularly preferably a compound having one three-membered cyclic ether group (monoepoxide). Further, as the cyclic ether, an alkylene oxide having a carbon number of 2, 3 or 4.

Specific examples of the cyclic ether include ethylene oxide, propylene oxide, 1,2-butylene oxide, 2,3-butylene oxide, isobutylene oxide, oxetane, methyloxetane, phenyl glycidyl ether, tetrahydrofuran, styrene oxide and alkyl glycidyl ether. The alkyl glycidyl ether may, for example, be ethyl glycidyl ether, butyl glycidyl ether or (2-ethylhexyl) glycidyl ether.

Preferred as the cyclic ether is ethylene oxide, propylene oxide or tetrahydrofuran. A formed by ring-opening of tetrahydrofuran is a tetramethylene group. At least one type of the cyclic ether may be used, and it is preferred to use at least two types. In a case where at least two types of the cyclic ethers are used, a mixture of at least two types of the cyclic ethers may be subjected to the reaction simultaneously, or at least two types of the cyclic ethers may be subjected to the reaction sequentially.

R in the fluorine-containing compound is a hydrogen atom, a $C_{1-18}$ alkyl group or a $C_{1-18}$ acyl group. The alkyl group is preferably a $C_{1-5}$ alkyl group, particularly preferably a methyl group, an ethyl group, a n-propyl group, a n-butyl group or a n-pentyl group. The acyl group is preferably a $C_{1-10}$ acyl group, particularly preferably a $C_{1-6}$ acyl group. R is preferably a hydrogen atom or a methyl group, particularly preferably a hydrogen atom.

The fluorine-containing compound of the formula 1 is preferably a compound wherein R is a hydrogen atom, n is from 2 to 100, and A is a $C_{2-4}$ alkylene group. Further, as the fluorine-containing compound of the formula 1, a compound of the following formula 1a is preferred:

$R^f$—O—$(CH_2CH_2O)_k$·$[CH_2CH(CH_3)O]_m$—H     Formula 1a where in the formula 1a, $R^f$ is as defined in the formula 1, and each of k and m which are independent of each other, is an integer of from 1 to 99, provided that k+m is from 2 to 100, and $(CH_2CH_2O)$ and $[CH_2CH(CH_3)O]$ may be connected in a block or randomly, preferably in a block.

Each of k and m which are independent of each other, is preferably from 1 to 30, particularly preferably from 2 to 10. k+m is preferably from 2 to 60, particularly preferably from 4 to 20. Further, it is preferred that k≧m.

Specific examples of the fluorine-containing compound (formula 1) including the following compounds, but the fluorine-containing compound is not limited thereto. Here, in the following compounds, the moiety corresponding to the $R^{fB}$ group may have a straight chain structure or a branched structure, preferably a straight chain structure. Further, in a case where a polyoxyalkylene chain containing at least two types of oxyalkylene groups is present, they may be connected in a block or randomly. The $(C_3H_6O)$ moiety is an oxypropylene group, and is $[CH(CH_3)CH_2O]$ or $[CH_2CH(CH_3)O]$. Further, the $(C_4H_8O)$ moiety is $(CH_2CH_2CH_2CH_2O)$ which is obtained by ring-opening of tetrahydrofuran.

In the present invention, the fluorine-containing compound may be used alone or in a combination as a mixture of at least two types thereof. $C_8F_{17}C_2H_4O(C_3H_6O)_{10}H$, $C_8F_{17}C_2H_4O(C_3H_6O)_4·(C_2H_4O)_8H$, $C_8F_{17}C_2H_4O(C_2H_4O)_{13}H$, $C_8F_{17}C_2H_4O(C_4H_8O)_3·(C_2H_4O)_{10}H$, $C_8F_{17}C_3H_6O(C_3H_6O)_{10}H$, $C_8F_{17}C_3H_6O(C_3H_6O)_4·(C_2H_4O)_8H$, $C_8F_{17}C_3H_6O(C_2H_4O)_{13}H$, $C_8F_{17}C_3H_6O(C_4H_8O)_3·(C_2H_4O)_{10}H$, $C_8F_{17}C_4H_8O(C_3H_6O)_{10}H$, $C_8F_{17}C_4H_8O(C_3H_6O)_4·(C_2H_4O)_8H$, $C_8F_{17}C_4H_8O(C_4H_4O)_{13}H$, $C_8F_{17}C_4H_8O(C_4H_8O)_3·(C_2H_4O)_{10}H$, $C_8F_{17}C_4H_8O[CH(C_6H_5)CH_2O]_2·[CH(CH_2OCH_3)CH_2O]_4H$, $C_8F_{17}C_4H_8O(C_3H_6O)_4·(C_2H_4O)_8CH_3$ and $C_8F_{17}C_4H_8O(C_3H_6O)_4·(C_2H_4O)_8COC_{18}H_{37}$.

The fluorine-containing compound of the present invention is preferably synthesized by subjecting a cyclic ether to ring-opening addition reaction with a fluorine-containing hydroxy compound of the formula 2:

$R^f$—OH     Formula 2 where in the formula 2, $R^f$ is as defined in the formula 1.

As a synthesis method of the fluorine-containing hydroxy compound of the formula 2 wherein the $R^{fB}$ group in $R^f$ is a $R^{FB}$ group and the carbon number in the C moiety is 1 ($R^{FB}CH_2OH$), a method may, for example, be mentioned wherein ethylene is added to a perfluoroalkyl iodide ($R^{FB}I$) obtained by the above-mentioned telomerization, followed by an alkali treatment to form a perfluoroalkyl ethylene ($R^{FB}CH=CH_2$), which is oxidized to form a perfluoroalkane carboxylic acid ($R^{FB}COOH$), which is then reduced with e.g. $NaBH_4$.

As a synthesis method of the fluorine-containing hydroxy compound of the formula 2 wherein the $R^{fB}$ group in $R^f$ is a $R^{FB}$ group and the carbon number in the C moiety is 2 $[R^{FB}(CH_2)_2OH]$, a method may be mentioned wherein ethylene is inserted into the above $R^{FB}I$ to form $R^{FB}(CH_2)_2I$, and then the terminal iodine atom is substituted with a hydroxyl group.

As a synthesis method of the fluorine-containing hydroxy compound of the formula 2 wherein the $R^{fB}$ group in $R^f$ is a $R^{FB}$ group and the carbon number in the C moiety is 3 $[R^{FB}(CH_2)_3OH]$, a method may be mentioned wherein allyl alcohol is added to the above $R^{FB}I$ to form $R^{FB}CH_2CHICH_2OH$, and then an iodine atom is substituted with a hydrogen atom with a reducing agent.

As a synthesis method of the fluorine-containing hydroxy compound of the formula 2 wherein the $R^{fB}$ group in $R^f$ is a $R^{FB}$ group and the carbon number in the C moiety is 4 $[R^{FB}(CH_2)_4OH]$, a method may be mentioned wherein 3-butene-1-ol is added to the above $R^{FB}I$ to form $[R^{FB}CH_2CHI(CH_2)_2OH]$, and then an iodine atom is substituted with a hydrogen atom with a reducing agent.

Further, as a synthesis method of $R^{fB}CH_2CH_2CH_2(OH)CH_3$ which is an isomer of the fluorine-containing hydroxy compound wherein the carbon number of the C moiety is 4 $[R^{FB}(CH_2)_4OH]$, a method may, for example, be mentioned wherein the above $R^{FB}CH=CH_2$ in a large amount of an ethanol solvent, having a predetermined radical initiator added thereto, is stirred under heating, and ethanol is added thereto for a radical addition reaction. As a synthesis method of $R^{FB}(CH_2)_5OH$ wherein the carbon number of the C moiety is 5, a method may be mentioned wherein 4-pentene-1-ol is added to $R^{FB}I$ to form $[R^{FB}CH_2CHI(CH_2)_3OH]$, and then an iodine atom is substituted with a hydrogen atom with a reducing agent.

Then, with the fluorine-containing hydroxy compound (formula 2) obtained by the above method, a cyclic ether is subjected to ring-opening addition reaction. In a case where at least two types of cyclic ethers are subjected to ring-opening addition reaction, they may be mixed and then subjected to the reaction, or they may sequentially be subjected to the reaction. The cyclic ether may be added to the reaction system all at once or gradually, in each case where one type alone is used or at least two types are used.

The amount of the fluorine-containing hydroxy compound (formula 2) varies depending upon the addition amount of the cyclic ether compound, however, it is preferred to add the compound in an amount of at least one tenth of the capacity of a reactor, taking e.g. stirring conditions of the reactor into consideration. Particularly when the volume efficiency is taken into consideration, the bulk ratio is preferably from 80 to 95% after the cyclic ether is added.

The ring-opening addition reaction is carried out preferably in the presence of a catalyst. As the catalyst, an alkali metal catalyst, an acid catalyst or a metal complex catalyst is preferred, and an acid catalyst or a metal complex catalyst is particularly preferred. The alkali metal catalyst, may, for example, be KOH, NaOH, CsOH or a three way catalyst comprising $NaBH_4/NaI/I_2$, the acid catalyst may be $BF_3$, and the metal complex catalyst may be a double metal cyanide complex such as a zinc hexacyanocobaltate ether and/or alcohol complex catalyst.

If the ring-opening addition reaction is carried out under a strongly alkaline condition, a side reaction wherein HF is eliminated at the $R^f$ moiety may occur in some cases, and accordingly when an alkali metal catalyst is used, it is preferred to use a three way catalyst comprising $NaBH_4/NaI/I_2$ which is a mild alkali catalyst. Further, in the case where an acid catalyst is used, if the acidity of the catalyst is too strong, a side reaction wherein HF is eliminated at the $R^f$ moiety may occur in some cases, and accordingly it is preferred to use a diluting solvent as the case requires in order to suppress the HF elimination. The diluting solvent may, for example, be an ether type solvent such as glyme, diglyme, triglyme or methyl-tert-butyl ether.

The reaction temperature of the ring-opening addition reaction of the cyclic ether is preferably from −20 to 180° C., particularly preferably from 0 to 130° C. In a case where a diluting solvent is used and the diluting solvent is a low boiling point diluting solvent, it is preferred to carry out the reaction at a temperature lower than "the boiling point of the solvent+20° C.", taking increase of the internal pressure into consideration.

The compound obtained by subjecting the cyclic ether to ring-opening addition reaction with the fluorine-containing hydroxy compound (formula 2) is a fluorine-containing compound of the formula 1 wherein the terminal is a hydroxyl group (R is a hydrogen atom), and by modifying the terminal hydroxyl group (such as esterification or alkylation), various properties can be adjusted.

The esterification is carried out preferably by reacting the fluorine-containing compound (formula 1) with an organic carboxylic acid, an organic carboxylate or an organic carboxylic anhydride. The organic carboxylic acid may be a monovalent carboxylic acid such as acetic acid, propionic acid, butanoic acid, 2-ethylhexanoic acid (octylic acid), 3,5,5-trimethyhexanoic acid (isononanoic acid), oleic acid or stearic acid, the organic carboxylate may, for example, be an ester of the above monovalent carboxylic acid with a low boiling point alcohol, and the organic carboxylic anhydride may, for example, be a monovalent carboxylic anhydride such as acetic anhydride, propionic anhydride, butanoic anhydride or n-butyric anhydride.

The esterification is carried out preferably in such a manner that the above organic carboxylic acid, organic carboxylate or organic carboxylic anhydride is added to the fluorine-containing compound (formula 1) wherein the terminal is a hydroxyl group (R is a hydrogen atom), followed by stirring under heating without a catalyst or in the presence of a catalyst, followed by dehydration, dealcoholization or removal of unreacted acid. As the catalyst, a slight amount of an acid catalyst such as para-toluenesulfonic acid or sulfuric acid, or an alkali catalyst such as potassium hydroxide or sodium hydroxide is preferred.

As the alkylation, a method of reacting the fluorine-containing compound (formula 1) with a monohaloalkyl under strongly alkaline conditions or a method of employing dialkylsulfuric acid may, for example, be mentioned, but a method of using an alkylating agent such as alkylsulfuric aid is preferred from such a viewpoint that the HF elimination can be suppressed.

The fluorine-containing compound (formula 1) obtained by the above various reactions is preferably purified by an acid treatment employing e.g. sulfuric acid or phosphoric acid or an adsorption treatment by employing synthetic magnesium silicate, activated clay or activated carbon, as the case requires, to make it have a high purity.

The addition amount of the fluorine-containing compound is preferably from 0.01 to 1 part by mass, particularly preferably from 0.01 to 0.4 part by mass, per 100 parts by mass of the total amount of the polyol and the polyisocyanate compound.

In the present invention, water is the main blowing agent. The amount of water is preferably from 4 to 16 parts by mass, particularly preferably from 6 to 12 parts by mass, per 100 parts by mass of the polyol. Further, in the present invention, it is more preferred to use only water as the blowing agent. However, depending upon the purpose, a conventional low boiling point halogenated hydrocarbon may be used together as a subsidiary blowing agent.

The low boiling point halogenated hydrocarbon is not particularly limited, and it may, for example, be a halogenated hydrocarbon containing a fluorine atom such as 1,1-dichloro-1-fluoroethane (HCFC-141b), chlorodifluoromethane (HCFC-22), 1,1,1,2-tetrafluoroethane (HFC-134a), 1-chloro-1,1-difluoroethane (HCFC-142b), 1,1-dichloro-2,2,3,3,3-pentafluoropropane (HCFC-225ca), 1,3-dichloro-1,1,2,2,3-pentafluoropropane (HCFC-225cb), pentafluoroethane (HFC-125), 1,1,2-trifluoroethane (HCFC225cb-143), 1,1,1-trifluoroethane (HFC-143a), 1,1,1,2,3,3-hexafluoropropane (HFC-236ea) or an isomer thereof, 1,1,2,2,3-pentafluoropropane (HFC-245ca) or an isomer thereof, 1,1,1,4,4,4-hexafluorobutane (HFC-356mff), 1,1,1,3,3-pentafluoropropane (HFC-245fa) or 1,1,1,3,3-pentafluorobutane (HFC-365mfc). In addition, a low boiling point halogenated hydrocarbon containing no fluorine such as methylene chloride may be used together as the blowing agent. Use of the halogenated hydrocarbon as the blowing agent is not preferred in view of the above-described environmental problems, but according to the present invention, the amount of water used can be increased to significantly decrease the amount of the halogenated hydrocarbon used without impairing properties of a foamed synthetic resin.

In a case where the low boiling point halogenated hydrocarbon is used together as the blowing agent, the amount of the low boiling point halogenated hydrocarbon used is preferably from 0.1 to 500 parts by mass per 100 parts by mass of water.

In addition, a hydrocarbon such as butane, pentane (cyclopentane) or hexane or an inert gas such as the air or nitrogen may also be used together as the blowing agent. In a case where an inert gas is used together as the blowing agent, the amount of the inert gas used is preferably from 0.1 to 500 parts by mass per 100 parts by mass of water.

As the catalyst in the present invention, a generally used urethanating reaction accelerating catalyst may be used. The generally used urethanating reaction accelerating catalyst may be a metal compound type catalyst such as an organic tin compound or a tertiary amine catalyst such as triethylenediamine or N,N,N',N'-tetramethylhexamethylenediamine. Further, e.g. a polymerizing catalyst of making isocyanate groups of e.g. a metal carboxylate be reacted, may also be used as the case requires. The amount of the catalyst may suitably be selected, and preferably from 0.1 to 10 parts by mass per 100 parts by mass of the polyol.

Further, in the present invention, it is preferred to use a surfactant to form favorable cells. As the surfactant, a silicone type surfactant is preferred. The amount of the surfactant may suitably be selected, and is preferably from 0.1 to 10 parts by mass per 100 parts by mass of the polyol. In addition, as an additive to be optionally used, a filler, a stabilizer, a colorant or a flame retardant may, for example, be mentioned. The flame retardant may be a conventionally used flame retardant for urethane, and the amount is preferably from 5 to 30 parts by mass per 100 parts by mass of the polyol.

In the present invention, the reaction temperature condition is not particularly limited, but the temperature of the material is usually preferably from 0 to 50° C., particularly preferably from 15 to 40° C.

According to the method for producing a rigid foamed synthetic resin by using water as a blowing agent of the present invention, a rigid foamed synthetic resin such as a closed cell rigid polyurethane foam excellent in long-term dimensional stability particularly dimensional stability at high temperature and high humidity conditions, can easily be obtained.

Now, the present invention will be described in further detail with reference to Examples. However, it should be understood that the present invention is by no means restricted to such specific Examples. Here, in Examples and Comparative Examples, "part(s)" is meant for "part(s) by mass".

EXAMPLES 1 to 5

With a polyisocyanate compound and a polyol in amounts shown in Table 1, a fluorine-containing compound, water, a general purpose silicone surfactant, a flame retardant and an amine catalyst in amounts shown in Table 1 were mixed at a liquid temperature of 20° C., and the mixture was put in a mold made of aluminum having a size of 400×400×50 mm, heated to 40° C., so that the overall density would be from 36 to 39 kg/m$^3$, and reacted. The proportion of isocyanate group: active hydrogen group=1.1:1 (isocyanate index: 110).

The density (kg/m$^3$), compression strength (MPa), dimensional stability and closed cell ratio of the obtained polyurethane foam are shown in Table 1.

Here, physical properties were measured in accordance with the following methods.

(1) Measurement of Compression Strength:

Measurement was carried out in accordance with JIS K7220.

(2) Measurement of Dimensional Stability:

Measurement was carried out in accordance with JIS A9511.

Here, with respect to the compression strength and dimensional stability, X and Y mean a lateral direction and T means a thickness direction.

(3) Measurement of Closed Cell Ratio:

The resin volume and the closed cell volume were measured by means of a high accuracy automatic volumenometer (VM-100, manufactured by ESTEC) by vapor phase substitution method.

TABLE 1

|  |  | Ex. 1 | Ex. 2 | Ex. 3 | Ex. 4 | Ex. 5 |
|---|---|---|---|---|---|---|
| Polyisocyanate compound | Polymeric MDI | 252 | 239 | 225 | 252 | 252 |
| Polyol | Polyol A | 100 |  |  | 100 | 100 |
|  | Polyol B |  | 100 |  |  |  |
|  | Polyol C |  |  | 100 |  |  |
| Fluorine-containing compound | F1 | 0.2 | 0.2 | 0.2 |  |  |
|  | F2 |  |  |  | 0.2 |  |
|  | F3 |  |  |  |  | 0.2 |
| Flame retardant |  | 10 | 10 | 10 | 10 | 10 |
| Blowing agent | Water | 8 | 8 | 8 | 8 | 8 |
| Surfactant |  | 5 | 5 | 5 | 5 | 5 |
| Catalyst |  | 1.8 | 1.5 | 0.9 | 1.8 | 1.8 |
| Reaction speed | Cream time (sec.) | 10 | 10 | 12 | 10 | 10 |
|  | Gel time (sec.) | 58 | 62 | 58 | 57 | 57 |
|  | Tack free time (sec.) | 82 | 87 | 82 | 81 | 80 |
| Density | Overall (kg/m$^3$) | 36 | 38 | 39 | 35.9 | 35.7 |
| Compression strength (MPa) | X | 0.171 | 0.188 | 0.195 | 0.170 | 0.170 |
|  | Y | 0.213 | 0.213 | 0.216 | 0.210 | 0.212 |
|  | T | 0.100 | 0.120 | 0.126 | 0.115 | 0.120 |
| Dimensional stability at −30° C. for 48 hours (%) | X | −1.5 | −0.1 | −0.2 | −1.2 | −1.0 |
|  | Y | −0.0 | −0.0 | −0.0 | −0.1 | −0.1 |
|  | T | −0.7 | −0.9 | −0.6 | −0.5 | −0.8 |
| Dimensional stability at 70° C. for 48 hours (%) | X | −0.0 | 0.0 | −0.0 | −0.0 | −0.0 |
|  | Y | −0.7 | −0.3 | −0.4 | −0.5 | −0.7 |
|  | T | −0.7 | −0.8 | −0.6 | −0.6 | −0.5 |
| Dimensional stability at 70° C. for 48 hours in a relative humidity of 95% (%) | X | −0.1 | −0.1 | −0.1 | −0.1 | −0.1 |
|  | Y | −0.1 | −0.1 | −0.1 | −0.2 | −0.1 |
|  | T | −0.9 | −1.6 | −1.9 | −0.8 | −0.7 |
| Closed cell ratio (%) |  | >90 | >90 | >90 | >90 | >90 |

In Table 1, the polyisocyanate compound and other abbreviations are as follows:

Polymeric MDI: MR-200, manufactured by NIPPON POLYURETHANE INDUSTRY CO., LTD., isocyanate group content: 31 mass %

Polyol A: obtained by adding propylene oxide to a mixture of sucrose and glycerol as an initiator, and adjusting the hydroxyl value to 450 mgKOH/g Polyol B: obtained by adding propylene oxide to sorbitol as an initiator, and adjusting the hydroxyl value to 400 mgKOH/g Polyol C: obtained by adding propylene oxide and ethylene oxide to toluenediamine (TDA) as an initiator, and adjusting the hydroxyl value to 350 mgKOH/g Fluorine-containing compound F1: obtained by subjecting a mixture comprising propylene oxide and ethylene oxide in a mass ratio of 30 to 70 to ring-opening addition polymerization with a $C_{12}$ fluorine-containing compound $C_8F_{17}CH_2CH_2CH(CH_3)OH$ by using a double metal cyanide complex catalyst (a zinc hexacyanocobaltate/glyme complex catalyst), and adjusting the average molecular weight to 800 (corresponding to the compound of the formula 1 wherein n is about 6.5).

Fluorine-containing compound F2: obtained by subjecting a mixture comprising propylene oxide and ethylene oxide in a mass ratio of 30 to 70 to ring-opening addition polymerization with a $C_{12}$ fluorine-containing compound $C_8F_{17}CH_2CH_2CH(CH_3)OH$ by using a double metal cyanide complex catalyst (a zinc hexacyanocobaltate/glyme complex catalyst), and adjusting the average molecular weight to 1,000 (corresponding to the compound of the formula 1 wherein n is about 11).

Fluorine-containing compound F3: obtained by subjecting a mixture comprising propylene oxide and ethylene oxide in a mass ratio of 50 to 50 to ring-opening addition polymerization with a $C_{12}$ fluorine-containing compound $C_8F_{17}CH_2CH_2CH(CH_3)OH$ by using a double metal cyanide complex catalyst (a zinc hexacyanocobaltate/glyme complex catalyst) and adjusting the average molecular weight to 1,000 (corresponding to the compound of the formula 1 wherein n is about 10).

Flame retardant: tris(β-chloropropyl)phosphate

Surfactant: silicone surfactant (SZ-1646, manufactured by Nippon Unicar Company Limited Catalyst: N,N,N',N'-tetramethylhexamethylenediamine, TOYOCAT-MR, manufactured by TOSOH CORPORATION COMPARATIVE EXAMPLES 1 to 3

With a polyisocyanate compound and a polyol in amounts shown in Table 2, water, a silicone surfactant, a flame retardant and an amine catalyst were mixed at a liquid temperature of 20° C. without addition of a fluorine-containing compound, and the mixture was put in a mold made of aluminum having a size of 400×400×50 mm, heated to 40° C., so that the overall density would be from 36 to 39 kg/m$^3$ and reacted. The proportion of isocyanate group: active hydrogen group=1.1:1 (isocyanate index: 110).

The density (kg/M$^3$), compression strength (MPa), dimensional stability and closed cell ratio of the obtained polyurethane foam are shown in Table 2.

TABLE 2

|  |  | Comp. Ex. 1 | Comp. Ex. 2 | Comp. Ex. 3 |
|---|---|---|---|---|
| Polyisocyanate compound | Polymeric MDI | 252 | 239 | 225 |
| Polyol | Polyol A | 100 | | |
|  | Polyol B | | 100 | |
|  | Polyol C | | | 100 |
| Fluorine-containing compound | | None | None | None |
| Flame retardant | | 10 | 10 | 10 |
| Blowing agent | Water | 8 | 8 | 8 |
| Surfactant | | 5 | 5 | 5 |
| Catalyst | | 1.8 | 1.5 | 0.9 |
| Reaction speed | Cream time (sec.) | 10 | 10 | 12 |
|  | Gel time (sec.) | 58 | 62 | 58 |
|  | Tack free time (sec.) | 82 | 87 | 82 |
| Density | Overall (kg/m³) | 37 | 39 | 39 |
| Compression strength (MPa) | X | 0.164 | 0.196 | 0.196 |
|  | Y | 0.197 | 0.226 | 0.230 |
|  | T | 0.089 | 0.110 | 0.124 |
| Dimensional stability at −30° C. for 48 hours (%) | X | −0.0 | 0.3 | −0.2 |
|  | Y | −0.1 | −0.0 | −0.2 |
|  | T | −2.0 | −0.5 | −1.0 |
| Dimensional stability at 70° C. for 48 hours (%) | X | −0.2 | −0.2 | −0.2 |
|  | Y | −0.3 | −0.3 | −0.3 |
|  | T | −0.8 | −0.8 | −0.6 |
| Dimensional stability at 70° C. for 48 hours in a relative humidity of 95% (%) | X | −1.0 | −0.8 | −1.0 |
|  | Y | −0.1 | −0.1 | −0.2 |
|  | T | −3.9 | −3.3 | −5.0 |
| Closed cell ratio (%) | | >90 | >90 | >90 |

According to the present invention, by a method for producing a rigid foamed synthetic resin by using water as a blowing agent, a rigid foamed synthetic resin such as a closed cell rigid polyurethane foam excellent in dimensional stability particularly dimensional stability at high temperature and high humidity conditions, can easily be obtained.

The entire disclosure of Japanese Patent Application No. 2001-218644 filed on Jul. 18, 2001 including specification, claims and summary are incorporated herein by reference in its entirety.

What is claimed is:

1. A method for producing a closed cell rigid foamed synthetic resin, comprising:
reacting a polyol with a polyisocyanate compound in the presence of
4–16 parts by mass of only water as a blowing agent, based on 100 parts by mass of the polyol,
a catalyst, and
a fluorine-containing compound of the Formula 1:

$$R^f\text{—O-(A-O)}_n\text{—R} \qquad \text{Formula 1}$$

wherein in the Formula 1, $R^f$ is a $C_{2-27}$ polyfluoroalkyl group or a group containing an oxygen atom or a nitrogen atom in a carbon-carbon bond of said polyfluoroalkyl group, n is an integer of from 1 to 100, A is an alkylene group having a carbon number in the straight chain portion between bonds of from 2 to 4, provided that when n is from 2 to 100, the plurality of A may be the same or different, and R is a hydrogen atom, an $C_{1-18}$ alkyl group or a $C_{1-18}$ acyl group.

2. The method according to claim 1, wherein R in the Formula 1 is a hydrogen atom.

3. The method according to claim 1, wherein n in the Formula 1 is from 2 to 100.

4. The method according to claim 1, wherein $R^f$ in the Formula 1 is a $C_{2-27}$ polyfluoroalkyl group.

5. The method according to claim 1, wherein the fluorine-containing compound is represented by the Formula 1a:

$$R^f\text{—O—(CH}_2\text{CH}_2\text{O)}_k\text{.[CH}_2\text{CH(CH}_3\text{)O]}_m\text{—H} \qquad \text{Formula 1a}$$

where in the Formula 1a, $R^f$ is a $C_{2-27}$ fluorine-containing organic group, and each of k and m which are independent of each other, is an integer of from 1 to 99, provided that k+m is from 2 to 100.

6. The method according to claim 1, wherein the fluorine-containing compound is used in an amount of from 0.01 to 1 part by mass per 100 parts by mass of the total amount of the polyol and the polyisocyanate compound.

7. The method according to claim 1, wherein as the polyol, a polyether polyol obtained by reacting an alkylene oxide with a bivalent to octavalent initiator and having a hydroxyl value of from 200 to 500 meq/g, is used.

8. The method according to claim 1, wherein as the polyisocyanate compound, an aromatic polyisocyanate or its modified product is used.

9. The method according to claim 1, wherein 6–12 parts by mass of water are used as blowing agent.

* * * * *